(12) United States Patent
McGuire

(10) Patent No.: US 9,468,201 B1
(45) Date of Patent: Oct. 18, 2016

(54) FISHING TACKLE STORAGE CONTAINER

(71) Applicant: Brian L. McGuire, New Boston, MI (US)

(72) Inventor: Brian L. McGuire, New Boston, MI (US)

( * ) Notice: Subject to any disclaimer, the term of this patent is extended or adjusted under 35 U.S.C. 154(b) by 275 days.

(21) Appl. No.: 14/290,701

(22) Filed: May 29, 2014

(51) Int. Cl.
*A01K 97/06* (2006.01)

(52) U.S. Cl.
CPC .................................. *A01K 97/06* (2013.01)

(58) Field of Classification Search
CPC ...................................................... A01K 97/06
USPC ......... 206/315.11, 486, 488; 242/395, 486.9, 242/487, 588, 588.3, 611; 43/57.2, 57.1, 43/54.1, 44.98
See application file for complete search history.

(56) References Cited

U.S. PATENT DOCUMENTS

| | | | |
|---|---|---|---|
| 2,789,389 A * | 4/1957 | Moen ..................... | A01K 97/06 43/57.2 |
| 3,032,914 A | 5/1962 | Valle | |
| 3,145,646 A * | 8/1964 | Levy ..................... | A47C 13/00 100/34 |
| 3,890,737 A | 6/1975 | Jones | |
| 4,108,397 A * | 8/1978 | Hauck ..................... | D04B 3/06 206/574 |
| 5,544,442 A | 8/1996 | Perkins | |
| 6,427,377 B1 * | 8/2002 | Kim ....................... | A01K 97/06 43/4 |
| 6,612,436 B1 * | 9/2003 | Zullo ..................... | B65D 51/28 206/391 |
| 2005/0103918 A1 * | 5/2005 | Bedwell ................ | B65H 75/38 242/388.6 |
| 2007/0114319 A1 * | 5/2007 | Anderson ............. | B65H 75/40 242/395 |
| 2008/0134566 A1 * | 6/2008 | Greaves ................ | A01K 97/06 43/57.1 |

* cited by examiner

*Primary Examiner* — Thien Thanh Pham
(74) *Attorney, Agent, or Firm* — Crossley & Stevenson Intellectual Property Law

(57) ABSTRACT

A case having a hinged top side spaced apart from a bottom side, a front side spaced apart from a back side, a left side spaced apart from a right side, a plurality of equally spaced apart vertical dividers disposed between the front side and the back side, a plurality of equally spaced apart horizontal dividers disposed between the left side and the right side, a plurality of equally sized compartments formed within the case by the vertical dividers and the horizontal dividers, and a plurality of identical spools, each spool rotatably housed within each compartment, respectively, such that various fishing tackle items are wound around each spool for organized, unentangled storage and retrieval.

1 Claim, 5 Drawing Sheets

FISHING TACKLE STORAGE CONTAINER

BACKGROUND OF THE INVENTION

Various types of fishing tackle boxes and cases are known in the prior art. However, what is needed is a fishing tackle storage container that provides for not only storage of fishing tackle individually separated but also winding the likes of leaders and harnesses in order to maintain such items without entanglement while providing both full visual and physical access.

FIELD OF THE INVENTION

The present invention relates to fishing tackle boxes and the like, and more particularly, to a fishing tackle storage container that provides advantages heretofore unavailable.

SUMMARY OF THE INVENTION

The general purpose of the present fishing tackle storage container, described subsequently in greater detail, is to provide a fishing tackle storage container that has many novel features that result in a fishing tackle storage container which is not anticipated, rendered obvious, suggested, or even implied by prior art, either alone or in combination thereof.

To accomplish this, the fishing tackle storage container comprises a case having a hinged top side spaced apart from a bottom side, a front side spaced apart from a back side, and a left side spaced apart from a right side. A recession is disposed within the hinged top side. The recession faces the bottom side. A plurality of perforations is disposed within the hinged top side. Perforations promote drying of the case as well as a plurality of spools and any fishing tackle within the case, potentially including a plurality of harnesses and a plurality of leaders and other tackle, whether purchased or self made.

A plurality of equally spaced apart vertical dividers is disposed between the front side and the back side. A plurality of equally spaced apart horizontal dividers is disposed between the left side and the right side. A plurality of equally sized compartments is formed within the case by the vertical dividers and the horizontal dividers. An axle hole is disposed and approximately centered within the vertical dividers within each compartment. A gear peg is disposed vertically upward within the bottom side in each compartment.

The plurality of identical spools is provided. Each spool further comprises an elastomeric covering. A pair of opposed spaced apart thumb wheels is disposed on each spool. A spool peg is disposed tangentially on each spool. Tangential placement of each spool peg enables easy removable attachment of a plurality of fishing tackle, without inadvertent dislodging. An axle is disposed centrally and longitudinally within each spool. A first beveled gear is partially, rotationally disposed on each gear peg. The gear peg does not extend fully up into each first beveled gear. A second beveled gear is connected to a one end of each axle. The second beveled gear is engaged with the first beveled gear. A crank is removably engaged with each first beveled gear. The crank is engaged via the part of the first beveled gear not surrounding the gear peg. Both the crank and the thumbwheels provide for rotating each spool. The crank is configured to rotate each first beveled gear by partial insertion into each first beveled gear. The rotation of each first beveled gear engaged with each second beveled gear, respectively, rotates each spool. A pair of spaced apart retainers is disposed within the recession. The retainers provide for removable receipt of the crank.

Each personally made crawler harness, leader as well as other tackle often comprises a loop. Each loop is hooked over each spool peg prior to winding each harness and each leader around each spool. While any tackle is selectively chosen by a user for containment on a spool, tackle having the loop noted is even more effectively contained. While not imperative, using a cork as the elastomeric covering of each spool provides advantages for a hook attachment for each harness and each leader and other tackle as desired. It is important to note that each tackle is individually housed and held and completely visible and separately accessible.

Thus has been broadly outlined the more important features of the present fishing tackle storage container so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
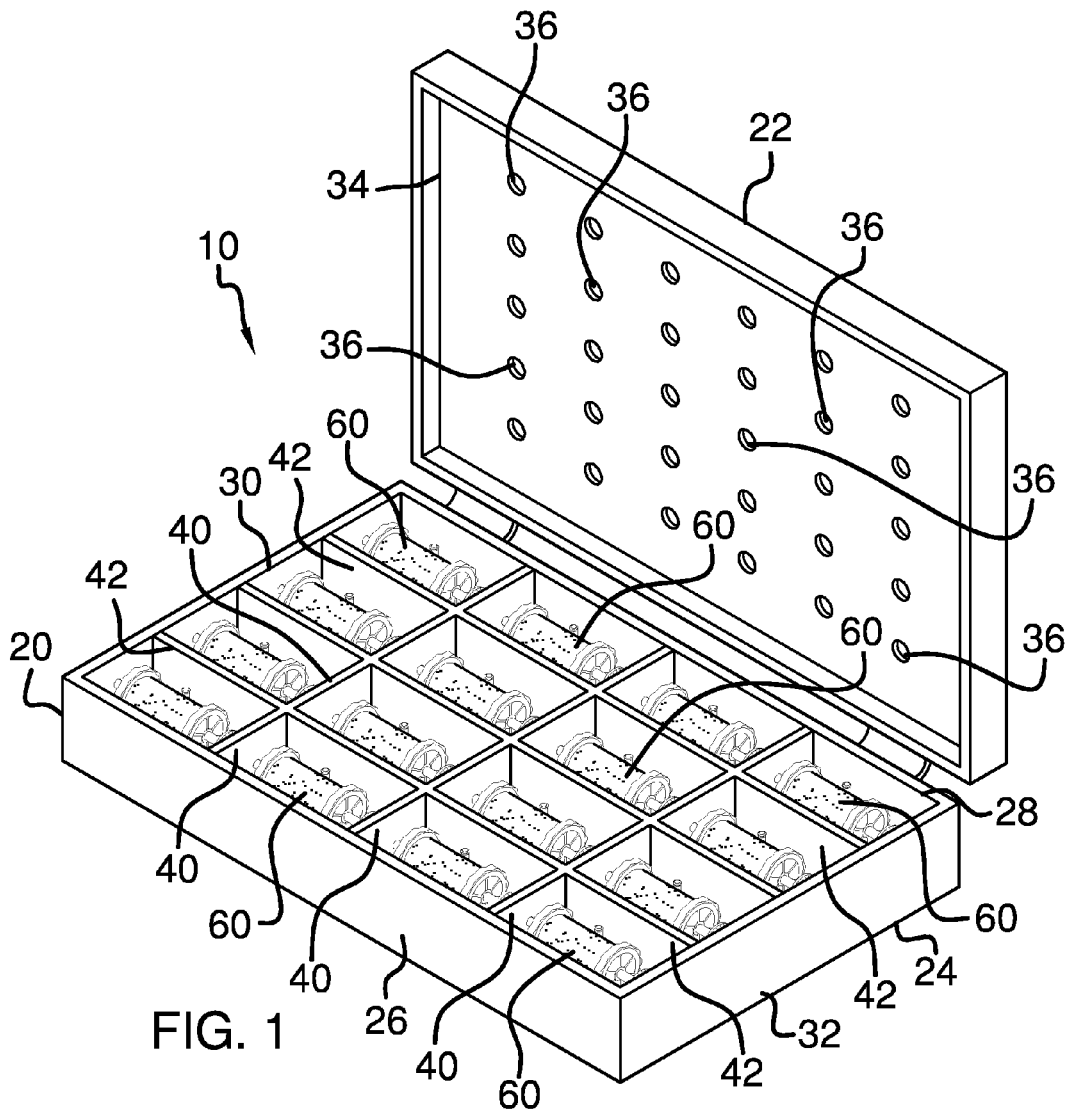
FIG. 1 is a perspective view of a container.
Figure 2:
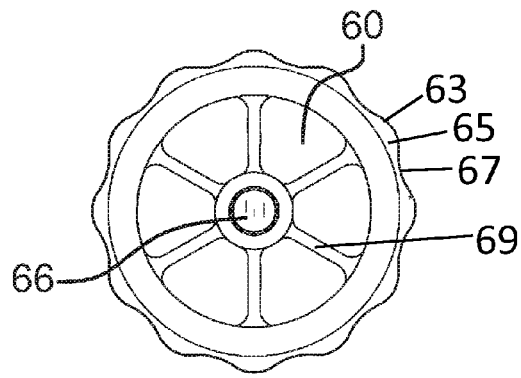
FIG. 2 is an end view of a spool.
Figure 3:
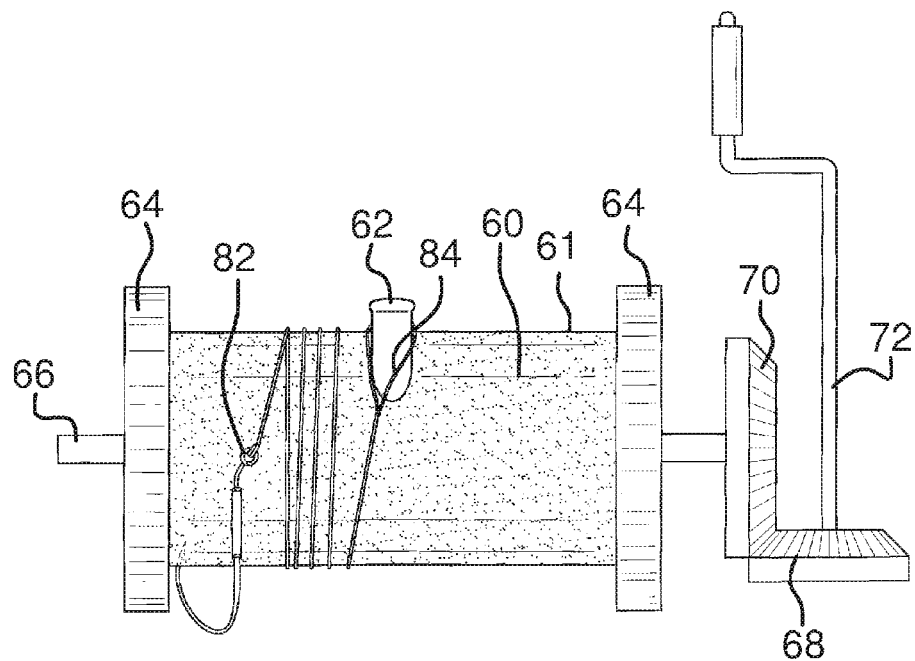
FIG. 3 is a front view of a spool and a crank.
Figure 4:
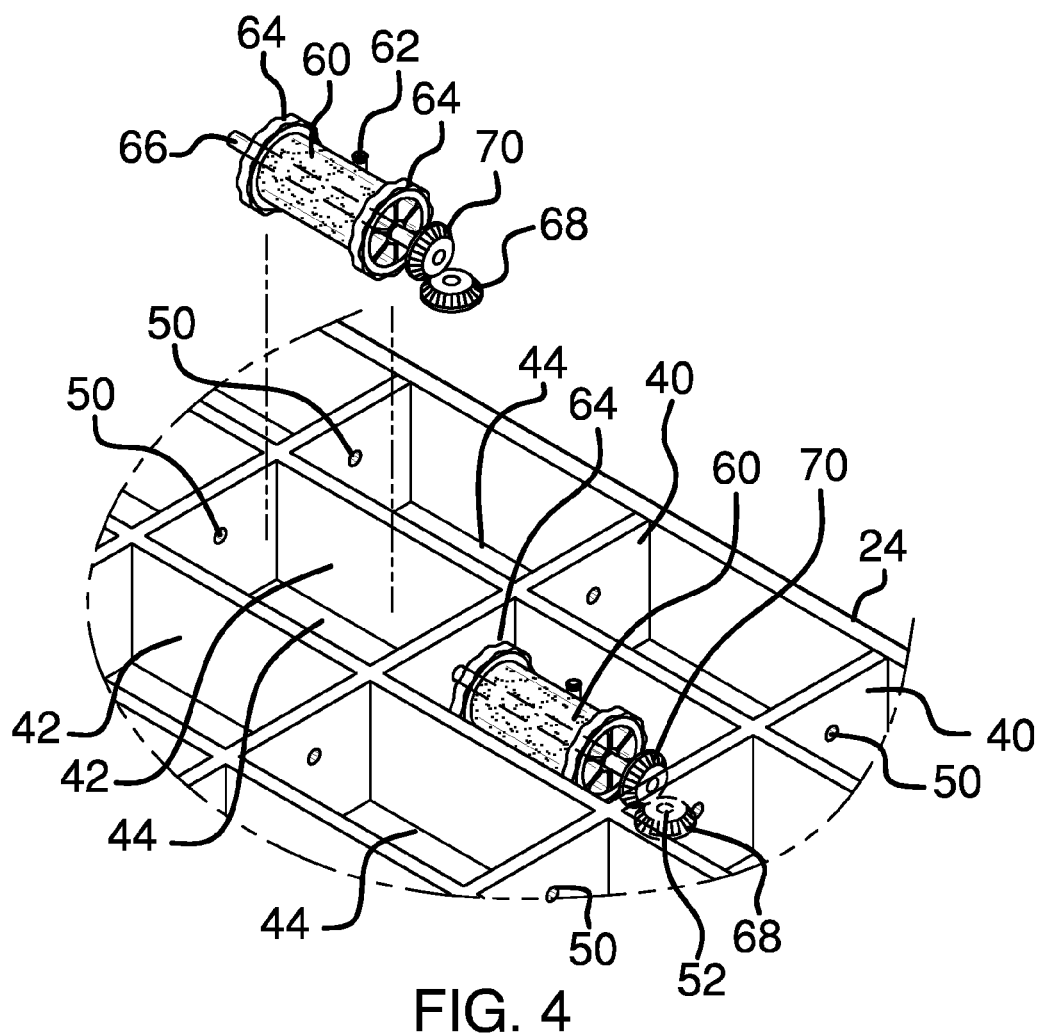
FIG. 4 is an exploded view of spools and a plurality of compartments.
Figure 5:
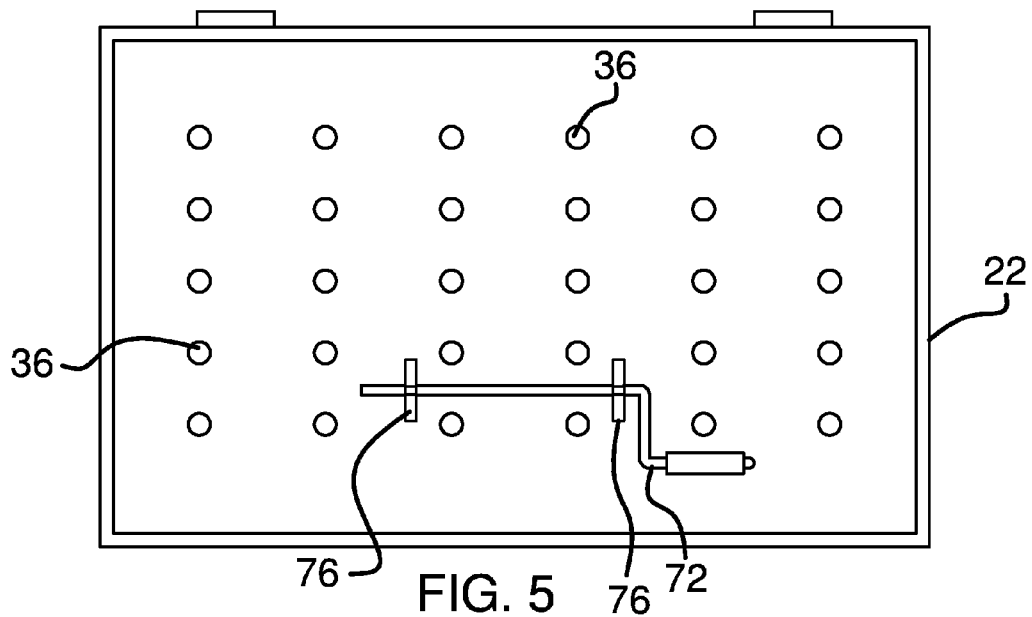
FIG. 5 is bottom plan view of a hinged top side.
Figure 6:
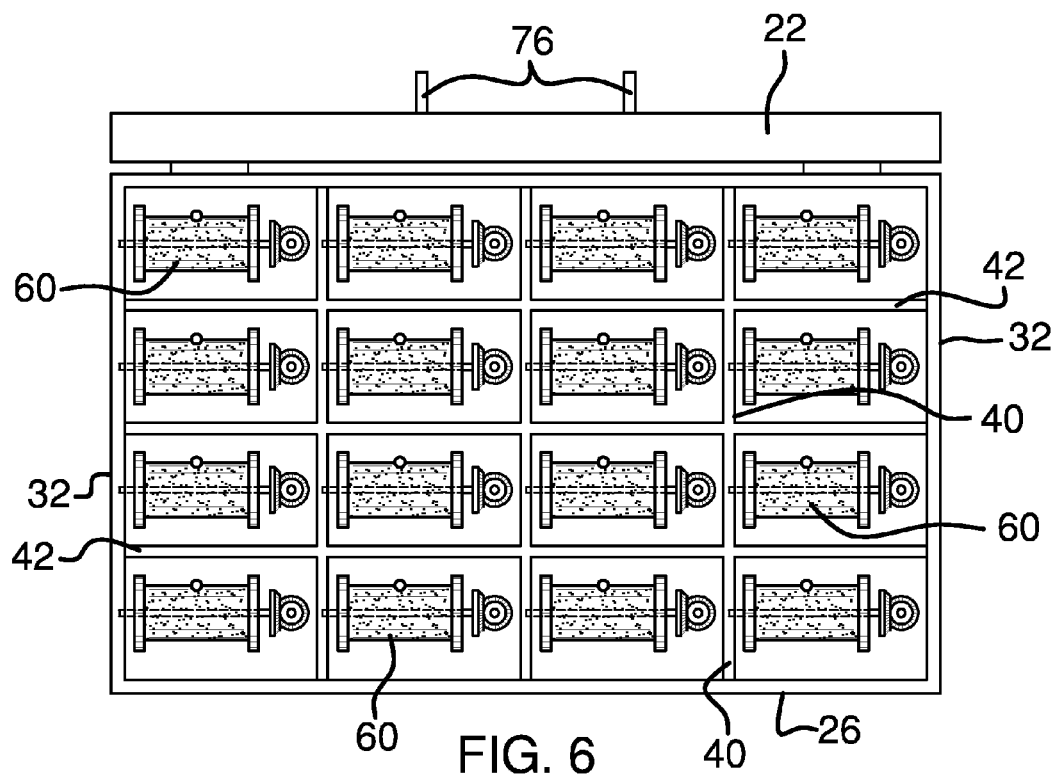
FIG. 6 is a top plan view of the container, the hinged top side open.
Figure 7:
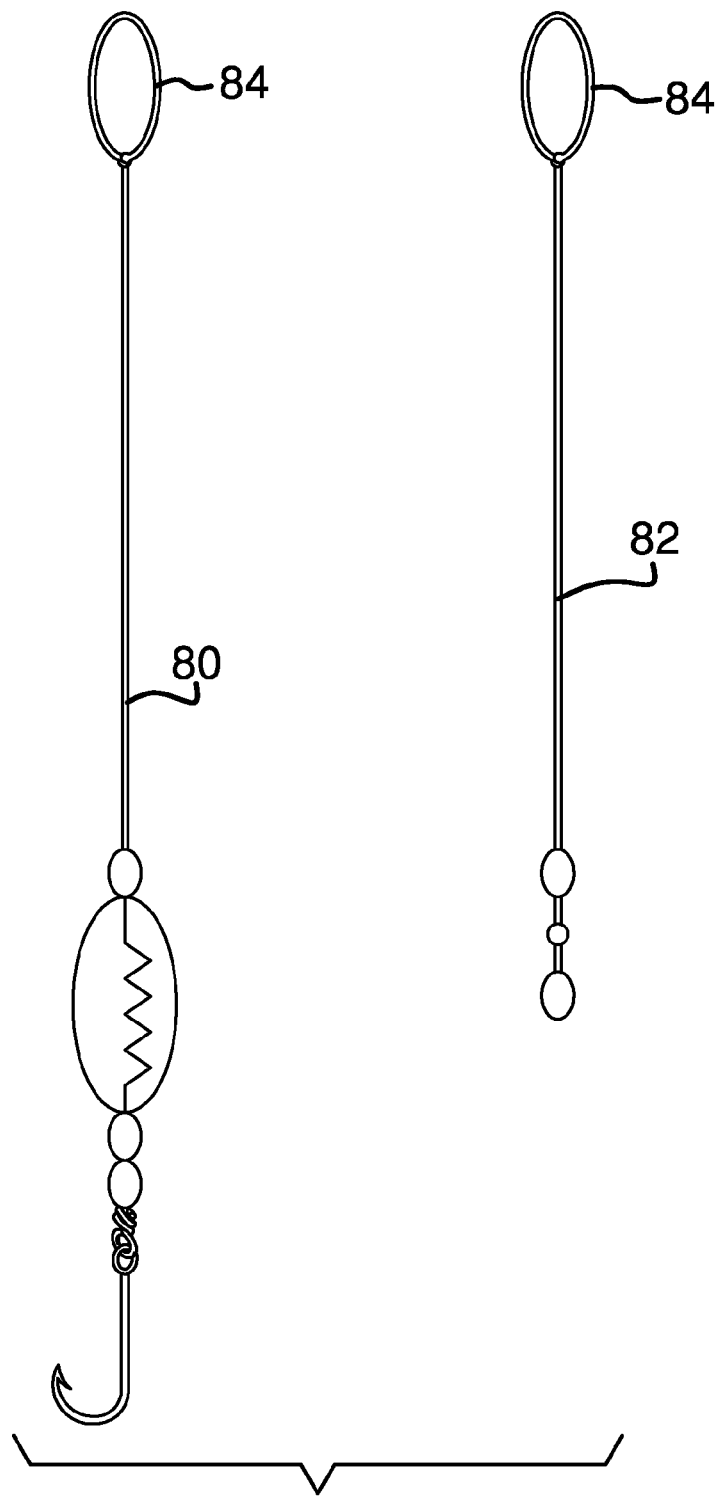
FIG. 7 is a front view of a harness and a leader.

With reference now to the drawings, and in particular FIGS. 1 through 7 thereof, an example of the fishing tackle storage container employing the principles and concepts of the present fishing tackle storage container and generally designated by the reference number 10 will be described.

Referring to FIGS. 1 through 7, the fishing tackle storage container 10 is illustrated. The fishing tackle storage container 10 comprises a case 20 having a hinged top side 22 spaced apart from a bottom side 24, a front side 26 spaced apart from a back side 28, and a left side 30 spaced apart from a right side 32. A recession 34 is disposed within the hinged top side 22. The recession 34 faces the bottom side 24. A plurality of perforations 36 is disposed within the hinged top side 22.

A plurality of equally spaced apart vertical dividers 40 is continuously disposed between the front side 26, the back side 28, the left side 30 and the right side 32. A plurality of equally spaced apart horizontal dividers 42 is continuously disposed between the left side 30, the right side 32, the front side 26 and the back side 28. A plurality of equally sized rectangular compartments 44 is formed within the case 10 by the vertical dividers 40 and the horizontal dividers 42, which are continuously disposed between the front side 26, the back side 28, the left side 30, and the right side 32. A circular axle hole 50 is disposed and approximately centered within the vertical dividers 40 within each compartment 44. A gear peg 52 is disposed vertically upward within the bottom side 24 in each compartment 44.

A plurality of identical spools 60 is provided. Each spool further comprises an externally disposed elastomeric covering 61. A pair of opposed spaced apart rotationable thumb wheels 64 is disposed on each spool 60. Each of the thumb wheels has a sinusoidal exposed outer edge 63 including a plurality of spaced apart rounded convex protrusions 65 and a plurality of spaced apart rounded concave notches 67 disposed therebetween. A spool peg 62 is disposed tangentially on each spool 60 of the plurality of identical spools 60. An axle 66 is disposed centrally and longitudinally within each spool 60. A plurality of spaced apart spokes 69 is radially disposed on the axle 66. A first beveled gear 68 is partially and rotationally disposed on each gear peg 52. A second beveled gear 70 is connected to a one end of each axle 66. The second beveled gear 70 is engaged with the first beveled gear 68 at a right angle relative the first beveled gear 68. A crank 72 is removably engaged with a respective one of each of the first beveled gears 68. The crank 72 and the thumbwheels 64 provide for rotating each spool 60. The crank 72 is configured to rotate the respective first beveled gear 68 by partial insertion into each first beveled gear 68. The rotation of the respective first beveled gear 68 engaged with the respective second beveled gear 70 rotates the respective spool 60 of the plurality of identical spools. A pair of spaced apart retainers 76 is disposed within the recession 34. The retainers 76 provide for removable receipt of the crank 72.

Personally made crawler harnesses 80 and leaders 82 each partially comprises a loop 84. Each loop 84 is hooked over each spool peg 62 prior to winding each harness 80 and each leader 82 around each spool 60. Using elastomeric covering in the external makeup of each spool 60 provides advantage of hook attachment for each crawler harness 80 and each leader 82 as desired. The perforations 36 promote drying of the case 20.

What is claimed is:

1. A fishing tackle storage container comprising:
   a case having a hinged top side spaced apart from a bottom side, a front side spaced apart from a back side, a left side spaced apart from a right side;
   a recession disposed within the hinged top side, the recession facing the bottom side;
   a plurality of perforations disposed within the hinged top side;
   a plurality of equally spaced apart vertical dividers extending continuously from the front side to the back side;
   a plurality of equally spaced apart horizontal dividers extending continuously from the left side to the right side;
   a plurality of equally sized rectangular compartments formed within the case by the vertical dividers and the horizontal dividers;
   a circular axle hole disposed and approximately centered within each of a respective one of the vertical dividers within each of said compartments;
   a gear peg disposed vertically upward within a bottom side in each of said compartments;
   a plurality of identical spools, one of each spool of the plurality of identical spools is removably contained within one of the compartments;
   an elastomeric covering disposed on each of said spools;
   a pair of opposed spaced apart rotationable thumb wheels disposed on each of said spools, each of the thumb wheels having an sinusoidal exposed outer edge including a plurality of spaced apart rounded convex protrusions and a plurality of spaced apart rounded concave notches disposed therebetween;
   a spool peg disposed tangentially on each spool of the plurality of identical spools;
   an axle extending through each spool of the plurality of identical spools, a respective one of said axles disposed centrally within each spool of the plurality of identical spools and revolvably disposed within a respective one of the axle holes within each compartment of the plurality of equally sized compartments, respectively;
   a plurality of spaced apart spokes radially disposed on the axle;
   each of said plurality of identical spools comprises a first beveled gear partially, rotationally disposed on the gear peg in the respective compartment of the plurality of equally sized compartments and
   a second beveled gear connected to one end of each respective axle of the plurality of axles of said each spool, said second beveled gear engaged with the first beveled gear of said each spool at a right angle;
   a crank removably engaged with a respective one of each of the first beveled gears; and
   a pair of spaced apart retainers disposed within the recession, the retainers in removable receipt of the crank;
   wherein the crank is configured to rotate the respective first beveled gear; and
   wherein the rotation of the respective first beveled gear engaged with the respective second beveled gear rotates the respective spool of the plurality of identical spools.

* * * * *